United States Patent [19]

Hara

[11] Patent Number: 4,638,388
[45] Date of Patent: Jan. 20, 1987

[54] METHOD OF MAKING A LINEARITY STANDARD MAGNETIC TAPE

[75] Inventor: Masaru Hara, Aichi, Japan
[73] Assignee: Sony Corporation, Tokyo, Japan
[21] Appl. No.: 685,122
[22] Filed: Dec. 21, 1984
[30] Foreign Application Priority Data
    Dec. 26, 1983 [JP] Japan .................................. 58-251877
[51] Int. Cl.$^4$ ........................ G11B 5/02; G11B 27/36
[52] U.S. Cl. ........................................ 360/18; 360/27; 360/31
[58] Field of Search ................... 360/18, 19.1, 20, 21, 360/25, 27, 31, 77, 65

[56] References Cited
U.S. PATENT DOCUMENTS
4,489,354 12/1984 Dann ....................................... 360/31
4,497,000 1/1985 Terada et al. .......................... 360/77

Primary Examiner—Vincent P. Canney
Attorney, Agent, or Firm—Lewis H. Eslinger; Alvin Sinderbrand

[57] ABSTRACT

A method of making a linearity standard magnetic tape includes the steps of providing a rotary magnetic head assembly including a pair of magnetic heads having gaps with different azimuth angles, respectively, and for recording slant tracks alternately on a magnetic tape, a circuit for supplying a first pilot signal of low frequency and a linearity standard signal of high frequency to one of the magnetic heads, and a circuit for supplying a second pilot signal of low frequency and a bias signal of higher frequency than that of the linearity standard signal to the other of the magnetic heads such that the bias signal is outside the recording or reproducing range of the heads and/or the tape.

7 Claims, 4 Drawing Figures

METHOD OF MAKING A LINEARITY STANDARD MAGNETIC TAPE

BACKGROUND OF THE INVENTION

1. Field of the Invention

This invention relates generally to a method of making a linearity standard magnetic tape and, in paticular, to a method of producing a linearity standard magnetic tape suitable for use for adjustment and inspection of a video tape recorder (VTR) of the type in which tracking pilot signals of low frequency and a video signal are superimposed on each other and then sequentially supplied to, for example, two video heads having gaps of different azimuth angles arranged in a rotary head assembly so as to record the video signal in overlapping tracks, and in which, upon playback, the tracking pilot signals are used to achieve correct tracking by the video heads.

2. Description of the Prior Art

During the manufacturing of a VTR having a rotary magnetic head assembly which includes two magnetic video heads with different azimuth angle gaps located apart from each other by a predetermined angular distance therebetween, and in which a video signal is normally supplied to the two magnetic video heads so as to record the video signal in overlapping tracks, a linearity standard magnetic tape is used. Such tape has recorded tracks of a signal of a predetermined frequency used for adjustment and inspection, and the tracks are recorded by using only one of the two magnetic video heads which have different in azimuth angle gaps. Generally, the record track on this standard tape is required to have excellent linearity, and therefore, during the manufacturing, it is necessary to inspect the linearity of the record track on the standard magnetic tape and to maintain a predetermined linearity thereof at all times.

For inspecting the linearity of the record track on the linearity standard magnetic tape, a suspension of carbonyl iron ($Fe_3O_4$) and a diluent such as a volatile liquid of "Freon" is coated on a predetermined area of this linearity standard magnetic tape and then a magentized pattern, in particular record tracks on the magnetic tape are developed or made visible as shown in FIG. 1. Then, as also may be seen from FIG. 1, the linearity is inspected by a so-called transverse method, in which the track distance between adjacent points along a one-dot chain line is measured. In this case, since the inspection signal is recorded on the linearity standard magnetic tape by using only one of the two magnetic video hands, there exist nonmagnetized portions between adjacent record tracks. Thus, the linearity of the linearity standard magnetic tape can be measured by this transverse method.

For 8 mm video VTRs, according to the standard specifications of "The 8 mm Video Standardization Conference" released on Mar. 28, 1983 (Weekly Television Digest, Apr. 4, 1983, Vol. 23:14), four pilot signals of low frequency, for example, $f_1$=about 102 KHz, $f_2$=about 116 KHz, $f_3$=about 160 KHz and $f_4$=about 146 KHz, are sequentially in superimposed, in a repeating cycle, on a video signal recorded on a magnetic tape in successive tracks by two magnetic video heads having different azimuth angle gaps arranged in a rotary magnetic head assembly. Upon playback, an ATF (automatic track finding) system is employed in which these pilot signals are used to control the tracking by the video heads.

If the above described linearity standard magnetic tape is used for such ATF-type VTRs and the recording is made by using only one of the two magnetic video heads as in the prior art, only one set of the pilot signals $f_1$ and $f_3$ (or $f_2$ and $f_4$) is recorded. As a result, if such linearity standard magnetic tape is played back, there results the disadvantage that the tracking on the VTR can not be achieved. Further, if the two magnetic video heads are used to sequentially record the pilot signals $f_1$, $f_2$, $f_3$ and $f_4$ repeatedly together with a predetermined measuring signal or a bias signal of predetermined high frequency, the magnetized tracks can not be visibly distinguished from each other even if the afore-noted coating is used, and so it is impossible to measure the linearity of the magnetized tracks during manufacturing of the linearity standard magnetic tape.

OBJECTS AND SUMMARY OF THE INVENTION

Accordingly, it is an object of this invention to provide an improved method of making a linearity standard magnetic tape.

It is another object of this invention to provide a method of making a linearity standard magnetic tape that is to be used in manufacturing of an ATF (automatic track finding) type video tape recorder (VTR).

It is a further object of this invention to provide a method of making a linearity standard magnetic tape, which permits the linearity of the magnetized tracks of the standard tape to be measured.

It is yet a further object of this invention to provide a method of making a linearity standard magnetic tape that is suitable for the adjustment of 8 mm video VTRs.

According to one aspect of this invention, there is provided a method of making a linearity standard magnetic tape comprising the steps of:

(a) providing rotary magnetic head means including a pair of magnetic heads having different azimuth angle gaps respectively and which are arranged for recording slant tracks alternately on a magnetic tape;

(b) supplying a first pilot signal of low frequency and a linearity standard signal of high frequency to one of said magnetic heads; and (c) supplying to the other of said magnetic heads a second pilot signal of low frequency and a bias signal of sufficiently higher frequency than that of said linearity standard signal recording or reproducing range of said heads or said tape.

The above, and other objects, features and advantages of the present invention, will become apparent from the following description taken in conjunction with the accompanying drawings, wherein the like references designate the same elements and parts.

DESCRIPTION OF THE PREFERRED EMBODIMENT

Now, the present invention will hereinafter be described with reference to the drawings.

Figure 2:
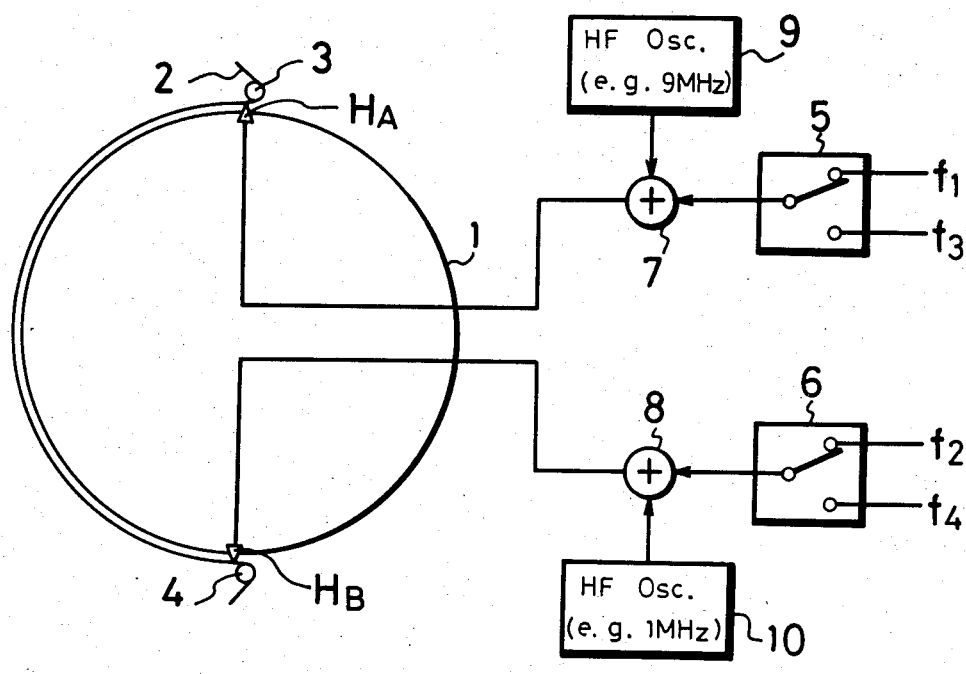
FIG. 2 is a circuit and construction diagram of a video tape recorder used for producing a linearity standard magnetic tape according to this invention (only those parts embodying the invention being shown)

In FIG. 2, references HA and HB, respectively, designate magnetic video heads having gaps with different azimuth angles that are mounted on a rotary drum 1 so as to form slant tracks on a magnetic tape 2. Reference numerals 3 and 4, respectively, designate tape guides that lead the magnetic tape 2 in a predetermined inclined path about drum 1. Reference numerals 5 and 6 designate change-over switches, reference numerals 7 and 8, respectively, designate adding circuits, and reference numerals 9 and 10, respectively, designate oscillating circuits that produce signals with frequencies of 9 MHz and 1 MHz, respectively. These two frequency values are presently preferred but are not mandatory. It is, however, essential that the lower frequency value of the two is remarkably higher than the above mentioned four low frequency pilot signals but still within a frequency range that can well be recorded and reproduced via the rotary magnetic heads, whereas the higher frequency value of oscillator 9 is selected from a frequency range above the frequency recording and reproducing capability of the heads and/or the magnetic tape. Further details in respect to those two frequency values will be given below.

Figure 1:
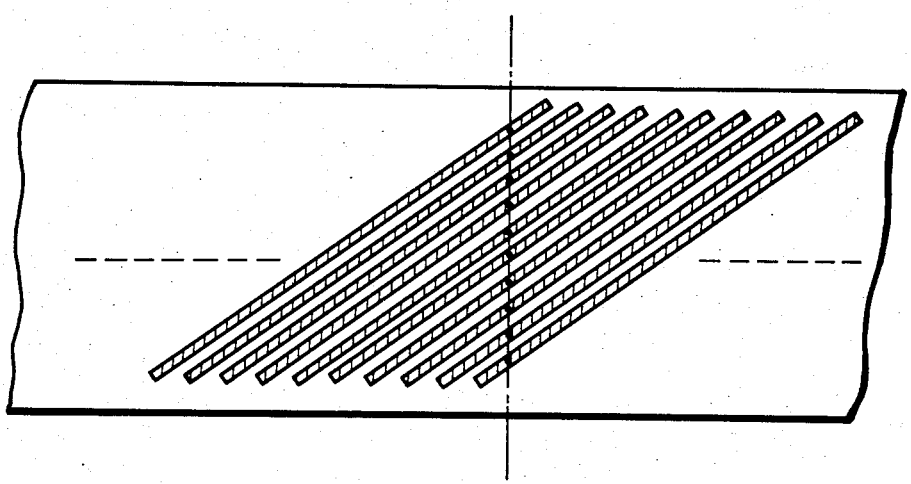
FIG. 1 is a diagrammatic view showing a portion of a magnetic tape with slant tracks recorded thereon and to which reference was made in explaining a prior art method (discussed above) of measuring the linearity of record tracks.
Figure 4:
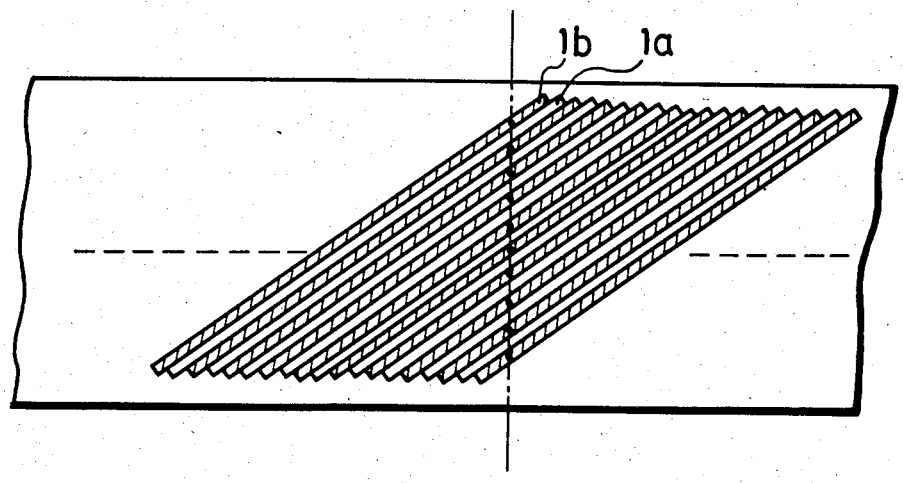
FIG. 4 is a scheme useful for explaining a method of measuring the linearity of record tracks produced in accordance with this invention.
Figure 3:
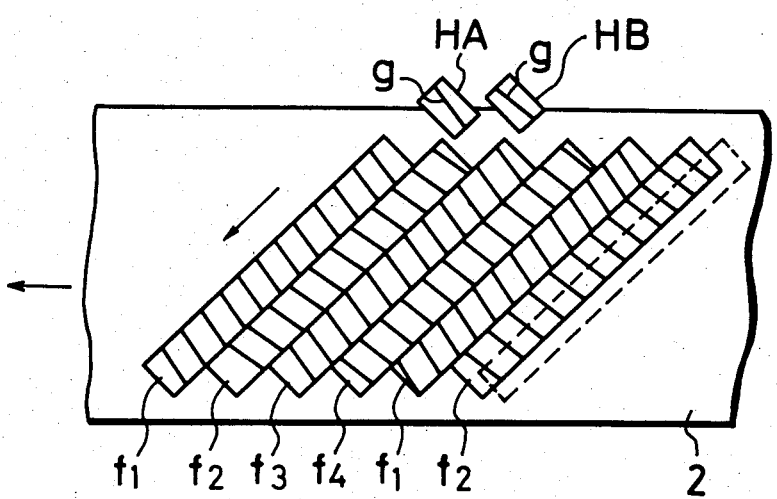
FIG. 3 is a diagrammatic view showing a portion of a linearity standard magnetic tape showing tracks recorded by the method according to the present invention.

In this VTR, pilot signals $f_1$, $f_2$, $f_3$ and $f_4$ for ATF (automatic track finding) are sequentially supplied in a repeated cycle through the change-over switches 5 and 6 to the two magnetic video heads HA and HB having gaps with different azimuth angles, respectively. Further, through the adding circuits 7 and 8, a signal of the relatively lower frequency is supplied from oscillator 10 to the magnetic video head HB, for example, said signal of 1 MHz that is used to measure the linearity of the track, while a signal of the relatively higher frequency is supplied from oscillator 9 to the magnetic video head HA, for example, said signal of 9 MHz that has an AC bias effect for the pilot signal but does not remain as a record. As a result, as shown in FIG. 3, tracks are formed on the magnetic tape 2 which repeatedly include the pilot signals $f_1$, $f_2$, $f_3$ and $f_4$. Now, if a suspension of carbonyl iron and diluent is coated on the predetermined area of the standard linearity magnetic tape and then this tape area is developed as shown in FIG. 4, a track $1b$ on which the signal of 1 MHz is recorded is developed and made visible, but a track $1a$ to which the signal of 9 MHz is applied remains invisible. That is, the track $1a$ on which the signal of 1 MHz is recorded can be made visible and this track $1a$ is formed at every other track position so that similarly to the prior art arrangement of FIG. 1, it is possible to measure the linearity of the track by the above described inspection method.

Therefore, according to this embodiment, without basically changing the inspection method itself, it is possible to satisfactorily measure the linearity of the record track of a linearity standard magnetic tape that is used in manufacturing or adjusting of ATF type VTRs.

When the linearity standard magnetic tape made by this method is used to adjust 8 mm video VTRs, it is sufficient that the VTR is placed in the playback mode and the heights of the tape guides are adjusted by observing the envelope pattern of the signal of the relatively lower frequency, e.g. the 1 MHZ signal that is reproduced from the magnetic video head HB and visualized on an oscilloscope (see e.g. "The Radio and Electronic Engineer", Vol. 44, No. 6, June 1974, p. 307 to 311). At this time, since the pilot signals $f_1$, $f_2$, $f_3$ and $f_4$ are sequentially played back from both magnetic video heads HA and HB, the tracking of the VTR can be correctly controlled by using these pilot signals $f_1$, $f_2$, $f_3$ and $f_4$.

Further, the frequency range recordable on the tape depends on the characteristic of the magnetic head used for recording and the characteristic of the magnetic tape. Therefore, it is desired that the oscillation frequency of the oscillating circuit 9 is selected to be in a range of about 6 to 11 MHz because the signal therefrom is able to act as the AC bias for the pilot signal but should not remain as a recording on the tape.

On the other hand, since the signal from the oscillating circuit 10 is required not only to remain as a recording but also to act as the AC bias for the pilot signal, the oscillation frequency of the oscillating circuit 10 is selected from a range of about 1 to 5 MHz.

The above description refers to a single preferred embodiment of the invention, but it will be apparent that many modifications and variations could be effected by one skilled in the art without departing from the spirit or scope of the novel concept of the invention.

I claim as my invention:

1. A method of making a linearity standard magnetic tape comprising the steps of:
   (a) providing rotary magnetic head means including a pair of magnetic heads having gaps with different azimuth angles, respectively, and for recording slant tracks alternately on a magnetic tape;
   (b) supplying a first pilot signal of low frequency and a linearity standard signal of high frequency to one of said magnetic heads; and
   (c) supplying to the other of said magnetic heads a second pilot signal of low frequency and a bias signal of sufficiently higher frequency than said linearity standard signal as to be omitted from the recording on said tape by said other magnetic head.

2. A method of making a linearity standard magnetic tape according to claim 1, in which said first pilot signal is alternately selected from two frequency signals.

3. A method of making a linearity standard magnetic tape according to claim 2, in which said second pilot signal is alternately selected from two frequency signals.

4. A method of making a linearity standard magnetic tape according to claim 1, in which said linearity standard signal is a signal with frequency of 1 to 5 MHz and is recorded on said magnetic tape.

5. A method of making a linearity standard magnetic tape according to claim 1, in which said bias signal is selected to have a frequency higher than 6 MHz.

6. A method of making a linearity standard magnetic tape according to claim 1; in which said magnetic tape is capable of recording signals only within a predetermined frequency range which includes the frequency of said linearity standard signal, and said frequency of the bias signal supplied with said second pilot signal is above said frequency range.

7. A method of making a linearity standard magnetic tape according to claim 1; in which said magnetic heads are capable of recording on said magnetic tape only signals within a predetermined frequency range which includes the frequency of said linearity standard signal, and said frequency of the bias signal supplied with said second pilot signal is above said frequency range.

* * * * *